Dec. 29, 1925.                                                    1,567,929
H. R. ELLIS
SHOCK ABSORBER
Filed Nov. 19, 1924

INVENTOR.
Horace R. Ellis,
BY
Geo. P. Kimmel ATTORNEY.

Patented Dec. 29, 1925.

1,567,929

UNITED STATES PATENT OFFICE.

HORACE RAYMOND ELLIS, OF MEADVILLE, PENNSYLVANIA.

SHOCK ABSORBER.

Application filed November 19, 1924. Serial No. 750,871.

*To all whom it may concern:*

Be it known that I, HORACE RAYMOND ELLIS, a citizen of the United States, residing at Meadville, in the county of Crawford and State of Pennsylvania, have invented certain new and useful Improvements in Shock Absorbers, of which the following is a specification.

This invention relates to shock absorbers employed more particularly upon motor driven vehicles, and has for one of its objects to simplify and improve the construction and increase the efficiency and utility of devices of this character.

Another object of the invention is to provide a device of this character having means whereby the smaller or lighter sizes of cavities or irregularities of surface of the roadway will not affect the improved device, but the deeper or larger irregularities only will affect the device and prevent jars and concussion incident to the dropping of the vehicle's wheels into the depressions or running over obstructions from reaching the body of the vehicle.

With these and other objects in view the invention consists in certain novel features of construction as hereinafter shown and described and then specifically pointed out in the claims, and in the drawings illustrative of the preferred embodiment of the invention.

Figure 1:
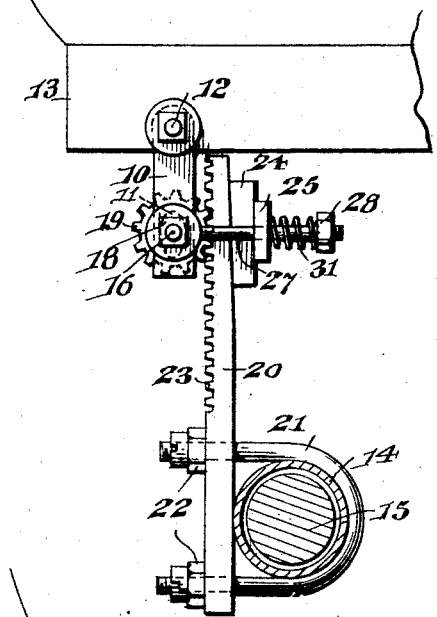
Figure 1 is a side elevation of the improved device together with a portion of the body of a vehicle and a transverse section of an axle and axle housing.
Figure 2:
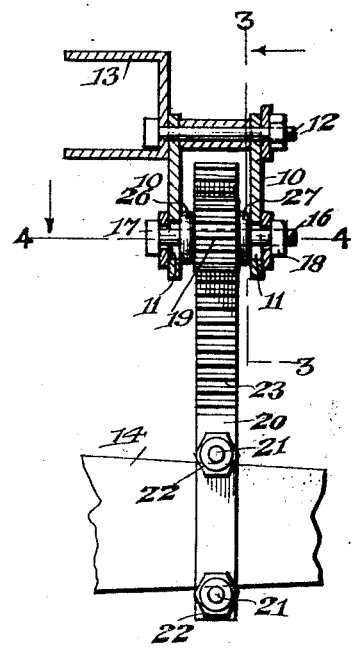
Figure 2 is a rear elevation of the improved device, partly in section.
Figure 3:
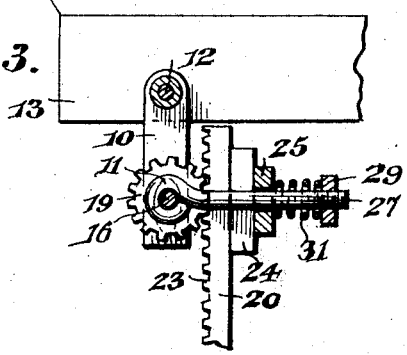
Figure 3 is a section on the line 3—3 of Figure 2, looking in the direction of the arrow.
Figure 4:
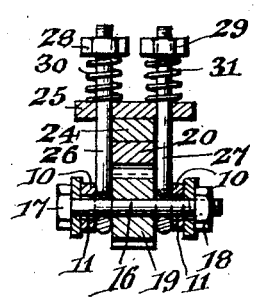
Figure 4 is a detail in section on the line 4—4 of Figure 2.
Figure 5:
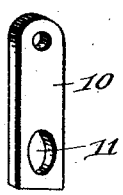
Figure 5 is a detached perspective view of one of the longitudinally slotted hangers.

The improved device includes a pair of hangers 10, longitudinally slotted as represented at 11 and attached in any suitable manner to the body of a vehicle, for instance by a bolt 12 extending from the body a portion of which is represented at 13.

Two pairs of the hangers 10 are employed, one pair upon each side of the vehicle, but only one is shown for illustration. The hangers are located above the rear axle, the housing of the latter being indicated conventionally at 14 with the axle therein at 15.

Extending loosely through the slots 11 of each pair of the hangers 10 is a short shaft 16 held from displacement laterally of the hangers by a head 17 and a nut 18. Mounted on each shaft 16 between the hangers 11 is a gear pinion 19.

A rack bar 20 is attached at one end in any suitable manner to the axle or its housing, for instance by a U bolt 21 and clamp nuts 22, with the teeth 23 of the bar in constant engagement with the pinion 19.

Bearing upon the rear face of the rack bar 20 is a bearing member formed of a relatively long longitudinal portion 24 and shorter transverse portion 25, the latter having perforations near the ends.

Twin rods 26 and 27 are each coupled to swing at one end by eyes upon the shaft 16, preferably between the pinion 19 and the hangers 10, and slidably extend through the apertures of the member 25, and are threaded at the outer ends to receive adjusting nuts 28, 29. Springs 30, 31 surround the rods 26 and 27 and bear against the member 25 and the nuts 28 and 29, and operate to yieldably press the member 24 constantly against the rack bar and hold it yieldably in engagement with the pinion.

With a device thus constructed and applied, when the vehicle is moving over relatively smooth roads, or over roads having only slight depressions or protuberances, the slots 11 in the hangers 10 will permit the bar 20 to move the pinion 19 and its shaft 16 bodily upwardly or downwardly and without affecting the springs 30, 31. The springs will possess sufficient resisting power to prevent them from being compressed except by abnormal strains.. If however abnormal depressions or protuberances are encountered, the wheels dropping into such depressions or running over such protuberances, and thereby causing jars or concussions, such jars or concussions will be absorbed by the yieldably supported rack bar and springs, and thus prevented from being transmitted to the body of the vehicle.

The improved device is simple in construction, can be adapted without material structural change to vehicles of various forms and construction and operates effectually for the purpose described and becomes effective only under abnormal conditions.

The preferred embodiment of the invention is disclosed in the drawings and set forth in the specifications, but it will be understood that modifications within the scope of the claimed invention may be made in the construction without departing from the principle of the invention or sacrificing any of its advantages.

The upper portion of the rack bar 20 may be gradually decreased in thickness toward the upper end, as shown in Fig. 1, to cause the resistance of the spring 31 to be increased as the bar is moved upwardly, if found necessary.

Having thus described my invention what I claim is:

1. A shock absorber comprising a gear and a rack bar adapted to be attached respectively to the body and axle of a vehicle, a bearing member with which the rack bar is slidably engaged, and a spring controlled means for holding said bearing member in yieldable engagement with the rack bar.

2. A shock absorber comprising a shaft adapted to be supported from a vehicle body, a gear mounted on said shaft, a rack bar engaging said gear and adapted to be coupled to the running gear of the vehicle, a bearing member with which the rack bar is slidably engaged, rods engaged by said shaft and slidable through said bearing member, and springs engaging said rods and operative to maintain said bearing member in yieldable engagement with said rack bar.

3. A shock absorber comprising longitudinally slotted hangers adapted to be attached to a vehicle body, a shaft extending through the slots of the hangers, a gear mounted on said shaft, a rack bar engaging said gear and adapted to be coupled to the running gear of the vehicle, a bearing member with which the rack bar is slidably engaged and provided with spaced guide apertures, rods engaged at one end with said shaft and slidable through the apertures in said bearing member, a spring engaging each of said rods and engaging the bearing member and operative to maintain said bearing member in yieldable engagement with said rack bar.

4. A shock absorber comprising longitudinally slotted hangers adapted to be attached in spaced relation to a vehicle body, a shaft extending through the slots of said hangers, a gear upon the shaft between the hangers, a rack bar engaging said gear and adapted to be coupled to the running gear of the vehicle, a bearing member having spaced apertures and with which the rack bar is slidably engaged, rods swinging at one end on said shaft and slidable through the apertures of the bearing member, and springs on said rod externally of the bearing member and operative to hold the bearing member in yieldable engagement with the rack bar.

In testimony whereof, I affix my signature hereto.

HORACE RAYMOND ELLIS.